United States Patent
Sipolins et al.

(10) Patent No.: US 12,541,857 B2
(45) Date of Patent: Feb. 3, 2026

(54) SYNTHESIZING IMAGES FROM THE PERSPECTIVE OF THE DOMINANT EYE

(71) Applicant: Adeia Imaging LLC, San Jose, CA (US)

(72) Inventors: Aldis Sipolins, Somerville, MA (US); Ning Xu, Irvine, CA (US); Tao Chen, Palo Alto, CA (US); Jean-Yves Couleaud, Mission Viejo, CA (US)

(73) Assignee: Adeia Imaging LLC, San Jose, CA (US)

( * ) Notice: Subject to any disclaimer, the term of this patent is extended or adjusted under 35 U.S.C. 154(b) by 345 days.

(21) Appl. No.: 18/240,305

(22) Filed: Aug. 30, 2023

(65) Prior Publication Data
US 2025/0078281 A1 Mar. 6, 2025

(51) Int. Cl.
| | |
|---|---|
| *G06V 40/20* | (2022.01) |
| *G06F 3/01* | (2006.01) |
| *G06T 3/40* | (2006.01) |
| *G06T 7/12* | (2017.01) |
| *G06T 7/13* | (2017.01) |
| *G06T 7/70* | (2017.01) |

(52) U.S. Cl.
CPC .............. *G06T 7/12* (2017.01); *G06F 3/013* (2013.01); *G06T 3/40* (2013.01); *G06T 7/13* (2017.01); *G06T 7/70* (2017.01); *G06V 40/28* (2022.01); *G06T 2207/20132* (2013.01)

(58) Field of Classification Search
CPC ... G02B 27/01–0189; G02B 2027/0105–0198; A61B 5/6803; G06V 40/20–28
See application file for complete search history.

(56) References Cited

U.S. PATENT DOCUMENTS

| | | |
|---|---|---|
| 3,414,349 A | 12/1968 | Vencel et al. |
| 7,946,707 B1 | 5/2011 | Mcdonald et al. |
| 10,893,801 B2 | 1/2021 | Liu et al. |
| 10,948,993 B2 | 3/2021 | Alexander |
| 2013/0050183 A1* | 2/2013 | Wang ............... H04N 13/161 345/419 |

(Continued)

FOREIGN PATENT DOCUMENTS

JP 2010264281 A 11/2010

OTHER PUBLICATIONS

Gerlinde Emsenhuber, "Eye-Perspective View Management for Optical See-Through Head-Mounted Displays", Apr. 2023 (Year: 2023).*

(Continued)

*Primary Examiner* — Andrew W Bee
*Assistant Examiner* — Caleb L Esquino
(74) *Attorney, Agent, or Firm* — HG Law LLP

(57) ABSTRACT

System and method are provided for capturing images based on dominant eye characteristics of a user. The system detects, by a wearable device, a hand gesture of the user indicating an image boundary for capturing an image from one or more cameras of the wearable device. The system generates, by the wearable device, the image based on (a) a dominant eye characteristic of the user, (b) the image boundary indicated by the hand gesture of the user, and (c) one or more images captured from the one or more cameras of the wearable device. The system stores, by the wearable device, the generated image to memory.

20 Claims, 10 Drawing Sheets

User Perspective

Camera Perspective

Cropped photo from camera perspective

(56) References Cited

U.S. PATENT DOCUMENTS

| | | | |
|---|---|---|---|
| 2016/0203360 A1 | 7/2016 | Alvarez | |
| 2022/0066221 A1* | 3/2022 | Yoon | G06F 3/017 |
| 2022/0103748 A1* | 3/2022 | Canberk | G06V 40/107 |

OTHER PUBLICATIONS

"Meta Quest Pro: Premium Mixed Reality | Meta Store," accessed May 8, 2023, [retrieved from URL: https://www.meta.com/quest/quest-pro/ on Nov. 6, 2023], 22 pages.

"Ray-Ban | Meta smart glasses 2023 | Ray-Ban® USA," accessed May 8, 2023, [retrieved from URL: https://www.ray-ban.com/usa/ray-ban-stories on Nov. 6, 2023], 5 pages.

"3D Body and Hand Tracking | Docs," accessed May 8, 2023, [retrieved from URL: https://docs.snap.com/lens-studio/references/guides/lens-features/tracking/body/object-tracking-3d#3d-hand-tracking-standalone on Nov. 6, 2023], 15 pages.

"Spectacles by Snap Inc. • The Next Generation of Spectacles," accessed May 8, 2023, [retrieved from URL: https://www.spectacles.com/], 5 pages (2023).

"The best way to understand VR and AR technology—Realize Medical," accessed May 8, 2023, [retrieved from URL: https://www.realizemed.com/understanding-vr-ar-tech/ on Nov. 6, 2023], 7 pages.

"Varjo XR-3—The industry's highest resolution mixed reality headset | Varjo," accessed May 8, 2023, [retrieved from URL: https://varjo.com/products/xr-3/ on Nov. 6, 2023], 6 pages.

Feng, B. Y., et al., "VIINTER: View Interpolation with Implicit Neural Representations of Images," https://arxiv.org/abs/2211.00722, 1-21 (2022).

Huang, H., et al., "An Introduction to Image Synthesis with Generative Adversarial Nets," https://arxiv.org/abs/1803.04469, 1-17 (2018).

McManus, I. C., et al., "Eye-dominance, writing hand, and throwing hand," Laterality, 4(2):173-92 (1999).

Emsenhuber, G., et al., "Eye-Perspective View Management for Optical See-Through Head-Mounted Displays," accessed May 8, 2023, [retrieved from URL: https://dl.acm.org/doi/fullHtml/10.1145/3544548.3581059 on Nov. 7, 2023], 11 pages (2023).

Bozomitu, R. G., et al., "Eye pupil detection using the least squares technique," 2016 39th International Spring Seminar on Electronics Technology (ISSE), 439-442 (2016).

"Mixed Reality Toolkit 3," accessed May 8, 2023, [retrieved from URL: https://learn.microsoft.com/en-us/windows/mixed-reality/mrtk-unity/mrtk3-overview/], 12 pages (2023).

* cited by examiner

User Perspective

Camera Perspective

Cropped photo from camera perspective

SYNTHESIZING IMAGES FROM THE PERSPECTIVE OF THE DOMINANT EYE

BACKGROUND

This disclosure is directed to apparatuses, methods and systems for capturing images more precisely from a perspective of a user.

SUMMARY

Wearable devices, such as smartglasses and augmented reality (AR) headsets, may have one or more cameras to enable a user to take video or photos of a surrounding environment, and may use hand tracking technology to enable hand gestures as an input for activities, such as taking photos or interacting with virtual objects. In some approaches, a user viewing a scene through display(s) or lens(es) of a wearable device can capture a photo of the scene using a camera of the device, and indicate boundaries for capturing the photo using hand gestures. However, the captured photo is from a perspective of the lens of the camera of the wearable device, which differs from a perspective of the user when the camera lens position is offset from user eye positions.

The difference in perspective between the camera view and the user view is further impacted, because a user can have a dominant eye, and perceive a scene from a right-eye or left-eye perspective. Further, an indicated position from a hand gesture that is perceived by a user (e.g., from a dominant eye) may not be the same as a determined position of the hand gesture (e.g., relative to a camera), which may further cause differences between the camera view and the user view, and may adversely impact user interaction with a virtual object.

To help address these problems, the present disclosure provides for various systems, apparatuses, and methods. In some examples, a system detects a hand gesture of a user indicating an image boundary for capturing an image from one or more cameras of a wearable device. The system may generate the image based on a dominant eye characteristic of the user, the image boundary indicated by the hand gesture of the user, and one or more images captured from the one or more cameras of the wearable device. The system may save (e.g., store) the generated image to storage (e.g., memory).

The system may extract parameters such as (x, y) coordinates from the hand gesture to define or determine the image boundary. In some cases, the system may generate the image without generating for display a preview of the image boundary. For example, a wearable device may not have a visual display output to the user, and the wearable device may capture the image without providing a preview to the user of the image boundary. In other cases, the system may generate for display a preview of the image boundary prior to the system generating the image. For example, a wearable device may include a display for the user enabling display of virtual objects onto a real-world view of the user.

In some implementations, the system may determine that the hand gesture of the user is no longer present in a current view of the one or more cameras of the wearable device. The system may capture, in response to the system determining that the hand gesture is no longer present in the current view, the one or more images that are used for generating the image from the one or more cameras. The dominant eye characteristic may include a dominant eye of the user. The system may generate a synthesized image from a perspective of the dominant eye of the user from the one or more images captured from the one or more cameras. The system may determine the image boundary from the perspective of the dominant eye of the user. The system may crop the synthesized image based on the determined image boundary, and the system may save (e.g., store) the cropped synthesized image as the generated image to storage (e.g., memory).

In some embodiments, the system accesses an eye dominance characteristic of a user, which may be stored in a user profile, for instance. The eye dominance characteristic may be input by a user, and/or may be determined by performing an eye-dominance test on the user. The eye dominance characteristics may be linked to a user profile, and automatically applied when user identity is confirmed.

In some implementations, the system generates the synthesized image based on positional offsets (e.g., x, y, and z coordinate offsets) between one or more front-facing cameras and the dominant eye of the user. The positional offset(s) may be a default offset for an average user (e.g., provided by device manufacturer), or may be determined based on eye tracking to identify and track a pupil or gaze of a user, and correlate a position of the pupil or gaze with position(s) of the device camera(s). Additional information, such as an interpupillary distance (IPD) of a user may be used to further improve accuracy of the offset (e.g., provided by the user or determined from eye tracking). If a position of the eyes is not known, IPD of the user may be used to infer eye positions based on front-facing camera distances from each other. The system may determine the positional offset(s) from an eye dominance test (e.g., which uses eye tracking) and/or other calibration processes. For instance, the system may instruct the user to take a selfie in a mirror while wearing the device, or with a secondary device (e.g., a smartphone), and use the captured images to determine the positional offset(s).

In some cases, the system generates one or more cropped synthesized image options from a perspective of each eye of a user, and enables the user to select a desired perspective from the options. Based on the user's selection of the option, the system may determine an eye preference of the user. The system may store the determined eye preference of the user in a user profile.

In some implementations, the system enables a user to position a camera of the wearable device at a view based on a dominant eye characteristic of the user (e.g., right, left, binocular view or view in between eyes of the user if no dominant eye) to capture an image. The system may determine the image boundary from the detected hand gesture based on the dominant eye characteristic of the user. The system may generate for display a preview of the image boundary and a preview view of a camera of the wearable device. The system may generate visual guides to adjust a position of the camera for the preview view of the camera to match the preview of the image boundary. The system may generate the image by capturing a camera image at the adjusted position of the camera representing a view based on the dominant eye characteristic of the user. The system may crop the captured camera image based on the determined image boundary to generate the image (cropped, captured image).

In some cases, a user may not have a dominant eye, and the system generates an image from a perspective in between the eyes of the user. For example, the system may determine an indication of strength of an eye dominance characteristic of the user is below a threshold amount. The system may generate a synthesized image from a perspective in between the eyes of the user from captured camera images, crop the synthesized image based on the determined image boundary, and store the cropped synthesized image to storage.

In some embodiments, the system generates a cropped synthesized image from a perspective of a dominant eye of the user. The system may zoom in on a determined image boundary indicated by a hand gesture before capturing images with the one or more cameras.

In some implementations, the system generates for display a virtual object, where a position of the virtual object is determined based on a position of one or more objects in the generated image. For example, the system determines a position of the virtual object based on the position of objects in the generated image from a perspective of a dominant eye of the user. As another example, the system adjusts a color of a virtual object based on the color of one or more pixels in the generated image corresponding to one or more positions in an edge of the virtual object.

As a result of the use of these techniques, wearable devices may enable capturing a photo from a perspective of the user.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
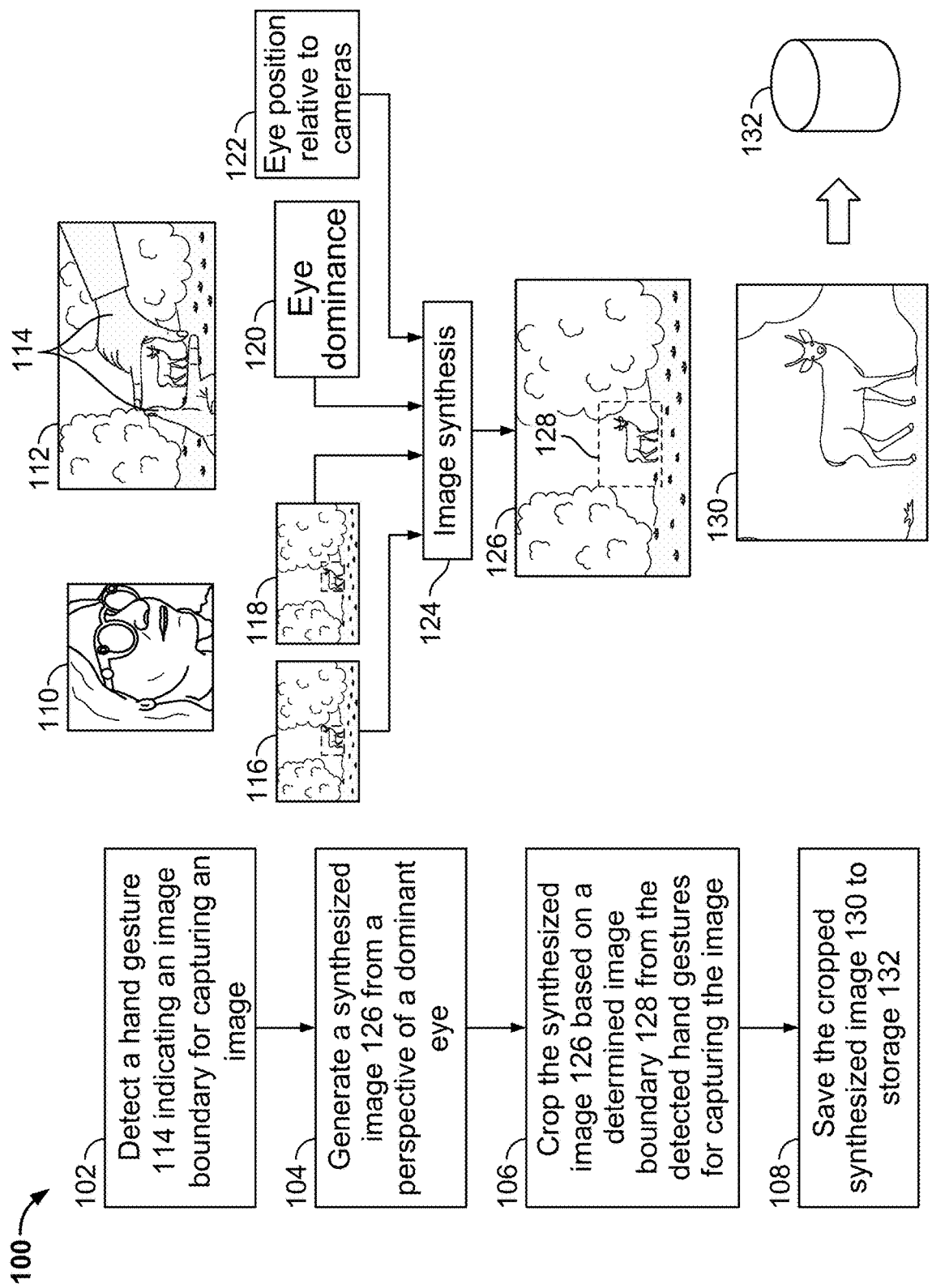
FIG. 1 shows an illustrative example of a method for capturing an image on a wearable device based on a dominant eye characteristic of a user, in accordance with some embodiments of this disclosure.

Handheld digital cameras and smartphones are known to provide a display or preview that defines a perspective and boundaries of a scene to be captured. For wearable devices (head-mounted displays (HMDs), near-eye displays (NEDs), smartglasses, AR headsets, etc.) there may not be such a display or preview of the scene before capturing an image. Accordingly, an image captured by such wearable devices may be less likely to accurately correspond to an intended perspective, and/or may not be defined by a desired boundary or cropping. Some embodiments of the present disclosure do not rely on a scene preview to capture an image of a scene from an intended perspective and/or with a desired boundary or cropping. The present disclosure helps to overcome these issues by providing image capture and processing techniques that determine and use eye dominance characteristics to help synthesize or identify an intended view perspective, and to accurately interpret gestures to help define boundaries of a scene to be captured.

Regarding an intended perspective of a user, to capture a photo from the same perspective of a user viewing a scene, a camera would need to be placed at the position of the eyes of the users (e.g., a camera worn on a user's eye, a contact lens camera). When capturing images using cameras of wearable devices (e.g., front-facing cameras on smartglasses or pass-through cameras on an AR headset), the physical distance between the eyes of the user and the cameras indicates a difference between the user viewpoint and the camera viewpoint. Embodiments of the present disclosure may overcome this issue by simulating images from a view of the user.

Another factor to consider when trying to capture an intended perspective of a user is eye dominance characteristics. Eye dominance characteristics of a user becomes relevant when a user performs a precise gesture near the eyes of the user, such as framing a photo with the hands of the user. However, smartglasses and extended reality (XR) wearable displays (e.g., augmented reality (AR), virtual reality (VR), and mixed reality (MR) head-mounted displays) may not make accommodations for eye dominance.

Eye dominance is a tendency to prefer visual input from one eye over the other. For example, a dominant eye's perspective gets priority over the other eye's perspective. Eye dominance can range from strong to weak, and a small percentage of people experience no eye dominance at all.

A test for eye dominance may be performed by having a user make a shape with their hands (e.g., triangle, rectangle, circle), holding the shape out to be viewed, and staring at a fixed point (e.g., feature) on the wall through the shape. Closing a right eye and having a view shift (and/or closing the left eye and having the view not change) indicates right-eye dominance. Closing the left eye and having a view shift (and/or closing the right eye and having the view not change) indicates left-eye dominance. The degree to which a view changes when one closes a left or a right eye indicates the strength of eye dominance.

FIG. 1 shows an illustrative example 100 of a method for capturing an image on a wearable device based on a dominant eye characteristic of a user, in accordance with some embodiments of this disclosure. For example, a user wearing a wearable device (e.g., smartglasses with two front-facing cameras) may use a hand gesture to indicate a region of interest (e.g., cropped area, boundary, frame) to capture an image. A desired position of a synthesized camera may be determined to represent the perspective of a dominant eye of the user (e.g., simulated camera perspective from a position of a pupil of the dominant eye). A synthesized image may be generated using images taken from the front-facing cameras to synthesize an image from this perspective. The detected hand gesture may be applied to the synthesized image to generate an image which accurately represents the user's intent and perspective. A live preview of the pre-edited photo may be displayed. In some embodiments, a single device (e.g., wearable device) performs the steps 102-108 of the method.

At step 102, the image capture system detects a hand gesture 114 indicating an image boundary for capturing an image. For example, image 110 shows a user wearing smartglasses with two front-facing cameras on the frame of the glasses (e.g., left and right cameras). Image 112 shows a viewpoint of a user through the smartglasses, including a hand gesture 114 of the user indicating a rectangular image boundary for capturing an image of a deer in a real-world environment from the two front-facing cameras of the smartglasses (e.g., one or more cameras of the wearable device). For example, the system may detect a hand gesture 114 using any suitable object recognition techniques (e.g., to recognize a hand or hands of a user).

The system may identify the hand gesture (e.g., left and right L-bracket gesture) to trigger the interaction, and extracts X, Y coordinates of relevant hand gestures (e.g., corners where fingers meet). Once the relevant parameters have been identified, the system determines the image boundary or cropping area. The system may or may not display a preview of the image boundary, and the user may lower their hands. Once the system detects that hands are no longer occluding the camera (e.g., camera view or image boundary region), the system may capture images from the front-facing camera(s) (e.g., one or more cameras) and use the captured images to synthesize and then crop an image from the perspective of the user's dominant eye.

Although smartglasses are shown as an example in image 110, any suitable wearable device including front-facing cameras may be used. For example, a wearable device may be AR glasses, an extended reality (XR) headset or head mounted display such as an augmented reality (AR), virtual reality (VR), mixed reality (MR) headset or head mounted display. Wearable devices may include microphones and speakers to enable voice instruction from a user or to provide audio to the user. Wearable devices may include displays to add information to what a wearer sees. Wearable devices may perform pose tracking, eye tracking, hand tracking, or any combination thereof to enable input from a user's motions, eyes, and gestures.

Smartglasses may have no spatial tracking, which may limit smartglasses to displaying information that is anchored to glasses rather than the environment. For example, smartglasses may overlay a 3D map onto a user's field of view, but the 3D map may continue to be displayed in the same static orientation and position as a user rotates their head and as their view changes, creating a feeling of the 3D map being stuck to the front of their head. AR glasses may have spatial tracking, which may enable displaying information anchored to the environment. For example, AR glasses may anchor the 3D map to an object in the real-world environment (e.g., a table) and enable a user to walk around the 3D map as it updates its orientation and position dynamically in response to changes in user perspective. Both smartglasses and AR glasses may include front-facing cameras. The disclosed techniques may be applied to wearable devices such as smartglasses, AR glasses, or any suitable wearable device with front-facing camera(s).

AR glasses may enable a user to see-through the glasses to a real-world environment. XR headsets or AR head mounted display may include front-facing cameras to enable pass-through AR. The disclosed techniques may be applied to wearable devices (e.g., AR glasses, XR headsets, or AR head mounted displays) that use see-through or pass-through AR, or any suitable device with front-facing camera(s).

Although a two-handed gesture is shown as an example in image 112, any type of hand gesture may be used (e.g., a single hand gesture) or any suitable gesture may be used (e.g., including different parts of the body such as arms, feet, etc.) or other objects (e.g., picture frame, pencil, ruler, etc.). Hand gestures have advantages in being used as an input because they obviate the need for a dedicated controller which may reduce hardware cost and size, weight, and power (SWaP) requirements. In some cases, smartglasses may use buttons on the glasses frame as input. However, hand gestures offer a more convenient input for activities that benefit from precise spatial control.

The system may determine the image boundary from the dominant eye characteristic of the user. In some cases, the dominant eye characteristic of the user may indicate a dominant eye of the user, and the system may determine the image boundary from the perspective of the dominant eye of the user. In other cases, the dominant eye characteristic of the user may indicate the user does not have a dominant eye, and the system may determine the image boundary from a perspective in between the eyes of the user. For example, a system may assign a number for eye dominance characteristics based on several tests and converted to a standard −1 to 1 scale. In some cases, −1 may indicate maximum left eye dominance, and 1 may indicate maximum right eye dominance. The threshold numbers for "no dominance" may fall in a range within the −1 to 1 scale (e.g., below a particular magnitude or threshold) and can be assigned based on research.

The system may extract spatial coordinates from the hand gesture 114 to determine the image boundary. For example, the system may extract X, Y coordinates from the detected hand gesture indicating an image boundary. For example, the system may extract X, Y coordinates from the detected hand gesture relative to a center, an origin, or a corner of a camera view.

In some embodiments, the system may generate for display on the wearable device a preview of the image boundary (e.g., preview of a cropped area). In other embodiments, the wearable device may or may not include a display, and no preview may be shown.

In some embodiments, the image capture system receives an input action triggering capture of the image. The input action may be a verbal command, a button press, a hand gesture outside the determined image boundary, or some combination thereof.

In one embodiment, when the user removes the hand gesture from the view, or the image capture system determines that the hand gesture or the hands of the user are no longer in a camera view of the wearable device or outside the determined image boundary, the image capture system proceeds to capture the image (e.g., proceed with steps 104-108).

At step 104, the image capture system generates a synthesized image 126 from a perspective of a dominant eye of the user. The image capture system may determine a dominant eye of the user from eye dominance characteristics of a user. The eye dominance characteristic of a user may indicate direction (e.g., which eye is dominant left or right) and can optionally include strength (e.g., strong or weak eye dominance). In some embodiments, eye dominance characteristics of a user is represented by a Boolean (e.g., true=right-eye dominant, false=left-eye dominant). In some embodiments, eye dominance characteristics of a user is represented as a number ranging from −1 to 1, with −1 and 1 indicating maximum strength eye dominance for the left and right eye, respectively.

Eye dominance characteristics could either be provided manually by the user or generated by the image capture system through an eye-dominance test. For example, an image capture system may provide test points, use eye tracking to determine a gaze of a user to generate a determined point as an intersection (e.g., right eye gaze, left eye gaze, combination of left and right eye gazes intersecting with a test plane in which the test points reside on). In some embodiments, as described in the description of FIG. 4, an image capture system may present different preview options to a user to select a preferred preview option. Based on the selected preview option, the image capture system may determine the eye dominance of the user.

In some embodiments, the image capture system captures image data (e.g., texture and depth data) from the front-facing cameras of the smartglasses. An image synthesis module 124 of the image capture system may take as input the captured left camera image data 116 and captured right camera image data 118, eye dominance characteristic 120 of the user, and eye position parameters 122 relative to the cameras to synthesize an image 126 from a view from the dominant eye of the user. The synthesized image 126 may simulate a photo being taken from a camera at a perspective of the dominant eye of the user. The image synthesis module 124 may use view interpolation to generate the synthesized image 126, for example, using a method as described in the description of FIG. 3A. The eye position parameters 122 are relative to cameras, for example, a default x, y, and z offset supplied by an eyeglass manufacturer for a default pupil position relative to a camera position as described in the description of FIG. 3B. The eye position parameters 122 (e.g., positional offset between eyes and cameras) may be based on default offset data from a manufacturer of the wearable device, eye tracking data, IPD of the user, or a combination thereof.

The synthesized image 126 may be generated from a perspective of the dominant eye of the user based on a positional offset between the dominant eye and a camera of the wearable device. The system may determine the positional offset between the dominant eye and a camera of the wearable device based on the eye position parameters 122. For example, if the dominant eye of the user is a left eye, the system may determine a left eye position relative to the cameras from the eye position parameters 122.

A small percentage of people experience no eye dominance at all. In some embodiments, although not shown in FIG. 1, where a user does not experience eye dominance, the image capture system may generate a simulated view from a perspective in between the eyes of the user.

At step 106, the image capture system crops the synthesized image 126 based on a determined image boundary 128 from the detected hand gesture for capturing the image. For example, the system may determine the image boundary from a perspective of a dominant eye of the user. The system applies the determined image boundary to crop the synthesized image from the perspective of the user's dominant eye. In other embodiments where the user does not have a dominant eye, the system may determine the image boundary from a perspective of a simulated view from a perspective in between the eyes of the user. For example, the system may determine a translation from the extracted X, Y coordinates from the detected hand gesture relative to a camera view to X, Y coordinates relative to a perspective of the user (e.g., synthesized view from a dominant eye of the user, or if the user does not have a dominant eye, synthesized view from a perspective in between the eyes of the user) to match a perspective of the user.

In steps 104 and 106, the system generates, by the wearable device, the image (e.g., image representing the user's intent and perspective) based on a dominant eye characteristic of the user, the image boundary indicated by the hand gesture of the user, and one or more images captured from the one or more cameras of the wearable device. In some embodiments, the system may generate the image representing the user using different methods than step 104 and 106.

In some implementations, instead of steps 104 and 106 of generating a synthesized image and then cropping the synthesized image, an image capture system may synthesize only the cropped region. The system may reduce computation demands by synthesizing only the cropped region instead of the entire view.

In other cases, instead of steps 104 and 106 of generating a synthesized image from captured camera views and then cropping the synthesized image, an image capture system may zoom in on the image boundary (e.g., cropped region) before taking the photo (e.g., capturing camera views to generate a synthesized image and then crop the synthesized image). The system may generate a higher quality image captured cropped image.

In some embodiments, instead of generating a synthesized image from captured camera views, the system may crop an image from a captured camera view. For example, the system may determine the image boundary from the detected hand gesture based on the dominant eye characteristic of the user. The system may capture an image from a camera of the wearable device, and crop the image based on the determined image boundary.

At step 108, the image capture system saves (e.g., stores) the cropped synthesized image 130 to storage 132 (e.g., memory). The storage 132 may be local to the wearable device. In some embodiments, the storage may be on a remote server.

Figure 2:
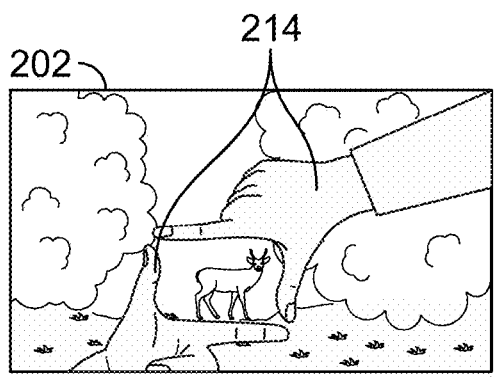
FIG. 2 shows an illustrative example of a problem of applying a detected hand gesture as an image boundary from a perspective of a camera of a wearable device.
Figure 2:
Figure 2:
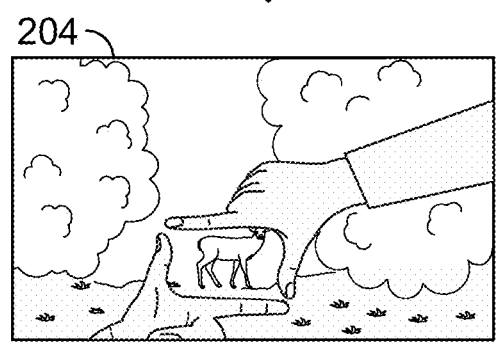
Figure 2:
Figure 2:
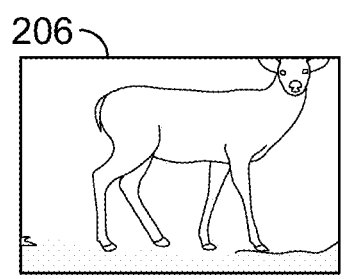

FIG. 2 shows an illustrative example of a problem of applying a detected hand gesture as an image boundary from a perspective of a camera of a wearable device.

Image 202 shows a view from a user perspective of hand gesture 214 indicating an image boundary. For example, the user may view a scene through smartglasses and use a rectangular hand gesture 214 to indicate an image boundary for capturing an image of a deer.

Image 204 shows a view from a camera perspective of a wearable device of the hand gesture 214. For example, a boundary for an image may be determined from the hand gesture 214 from the camera perspective of the wearable device.

Image 206 shows the result of applying the determined boundaries of the hand gesture 214 from the camera perspective of the wearable device to capture an image from a view of the camera perspective of the wearable device. The resulting image 206 shows that a portion of the deer's head is cropped out, which is different from an expected image from the user perspective shown in image 202, where the deer is centered in the frame created by the hands of the user.

Figure 3A:
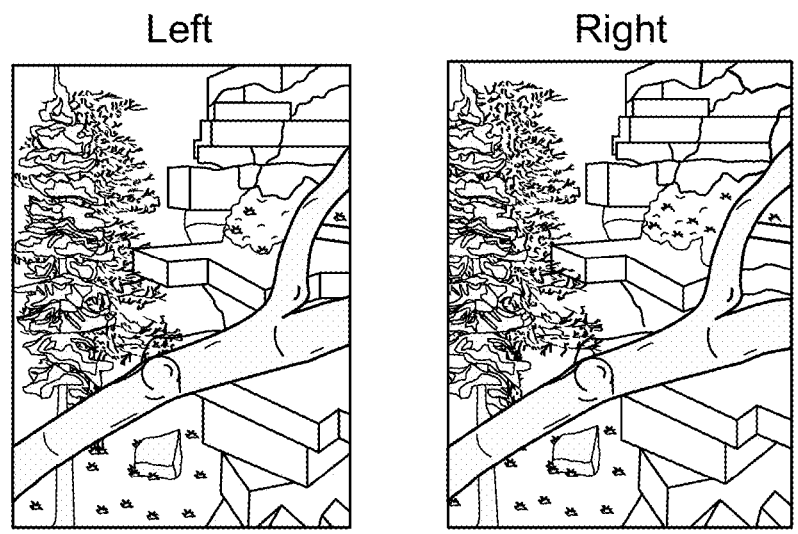
FIG. 3A shows an illustrative example of images captured from left and right cameras of a wearable device, in accordance with some embodiments of this disclosure.

FIG. 3A shows an illustrative example of images captured from left and right cameras of a wearable device, in accordance with some embodiments of this disclosure. In some embodiments, view interpolation is used to synthesize new images or views of a scene based on a set of pre-existing input images. For example, a synthesized image may be generated from a set of image data captured from left and right cameras. The synthesized image may simulate taking an image from a perspective in between the camera positions that the input images were taken from.

View interpolation uses estimation of geometric and photometric relationship between input images using techniques such as depth estimation, optical flow, and feature-based methods. Novel views may be generated by blending and warping the original images or other pre-existing input images. In some embodiments, view interpolation may be made using images and depth data from one camera in one perspective instead of two cameras from two perspectives.

In some embodiments, a center image is generated using view interpolation. For example, left and right front-facing cameras may acquire depth maps for both input images through stereo matching techniques. With these depth maps and camera parameters, a scene can be reconstructed in 3D coordinates (e.g., a point cloud). The 3D points may be projected onto the 2D image plane corresponding to the desired center view, resulting in warped versions of the left and right images. The warped images may be merged using a method such as weighted averaging, which considers pixel visibility and consistency to reduce artifacts and ghosting. The result would be a visually coherent center image, created by leveraging the depth information from the stereo image pair.

In some embodiments, view interpolation uses deep learning. For example, explicit depth estimation or stereo matching may be replaced by training deep neural networks on the underlying scene geometry, depth, and appearance. Models, such as general adversarial nets and implicit neural representations of images, may capture complex relationships between input views and synthesize novel perspectives with high visual quality.

Figure 3B:
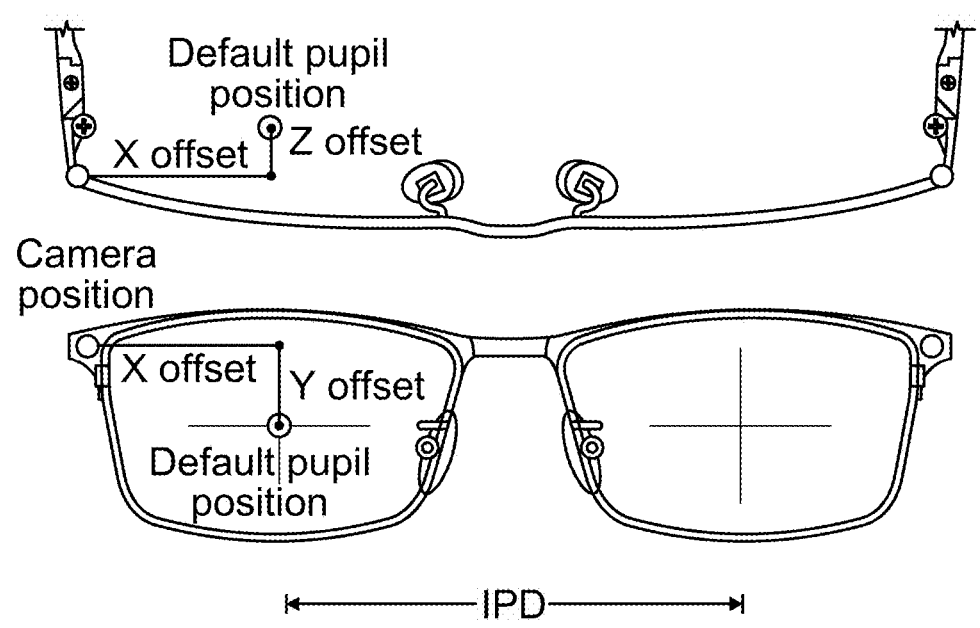
FIG. 3B shows an illustrative example of a default offset of a pupil position to a camera position from a wearable device manufacturer, in accordance with some embodiments of this disclosure.

FIG. 3B shows an illustrative example of a default offset of a pupil position to a camera position from a wearable device manufacturer, in accordance with some embodiments of this disclosure. The system may use the default XYZ offset between front-facing cameras and a user's dominant eye. Default offsets for an average user may be provided by the wearable device manufacturer, and the offset may be further refined using eye tracking. The user may optionally provide their IPD to further improve the accuracy of the offset, if eye tracking is not available.

Figure 4:
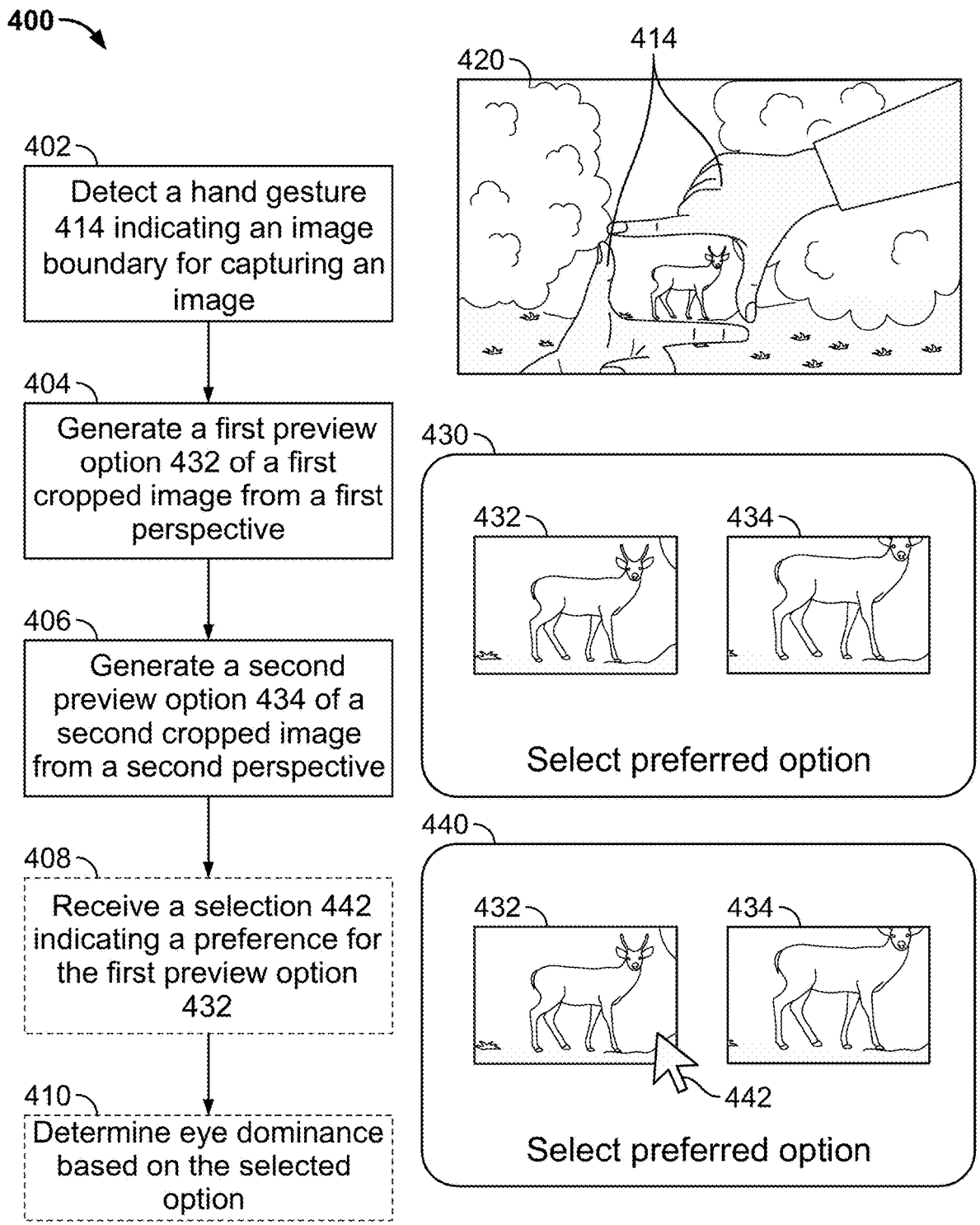
FIG. 4 shows an illustrative example of a method to determine eye dominance of a user based on a selected preview option for a wearable device, in accordance with some embodiments of this disclosure.

FIG. 4 shows an illustrative example 400 of a method to determine eye dominance of a user based on a selected preview option for a wearable device, in accordance with some embodiments of this disclosure. In some embodiments, a system may not have an eye dominance characteristic of a user and synthesize images from a perspective of both eyes. For example, a user may have not indicated eye dominance, or eye dominance characteristic may not be present in a user profile. The system may generate cropped synthesized image based on detected user gesture for each eye of the user and let a user choose a preferred option. In some embodiments, the system may provide an option of a synthesized image from a position in between the eyes of a user (e.g., for a user that does not have a dominant eye).

At 402, the system detects hand gestures 414 indicating an image boundary for capturing an image. Step 402 of FIG. 4 is similar to step 102 of FIG. 1. The system may detect that a user has moved the gesture out of the camera view or outside of a detected image boundary, and may proceed to step 404). Image 420 shows a viewpoint of a user including a hand gesture 414 of the user indicating a rectangular image boundary for capturing an image of a deer in a real-world environment.

At 404, the system generates a first preview option 432 of a first cropped image from a first perspective. For example, a first perspective may be from a left eye of the user.

At 406, the system generates a second preview option 434 of a second cropped image from a second perspective. For example, a first perspective may be from a right eye of the user.

Image 430 shows an example of a user interface, in which both the first preview option 432 and the second preview option 434 are shown, along with the text (e.g., instruction) "Select preferred option". The first preview option 432 shows a first cropped in which the deer appears to be appropriately cropped in a real-world environment (e.g., entire deer is shown in the cropped image). The second preview option 434 shows a second cropped image of a deer in which a portion of the head of the deer is cropped out of view. In some embodiments, the user interface is displayed on a wearable device (e.g., smartglasses) over an entire view of a user. In some embodiments, although not shown in FIG. 4, the user interface may be overlaid or displayed over a real-world view, or displayed in a portion of a user's view (e.g., window of a portion of the real-world view, picture-in-picture view). In some embodiments, the user interface may be displayed on another device (e.g., smartphone, tablet, or any suitable computing device) that smartglasses are communicatively coupled to, and the user may select the preferred preview option on the device.

At 408, the system may receive a selection 442 indicating a preference for the first preview option 432. The user may select the preview option using a voice command (e.g., preference for the image shown on the left), eye tracking (e.g., fixating eyes on option, blinking), a hand gesture (e.g., pointing to a position corresponding to the option, tapping), a touch input (e.g., tapping a right or left side of a frame of a wearable device), or any suitable user input. The wearable device may display a cursor that indicates the user input when the user is selecting the preferred option (e.g., if using eye tracking, cursor may move with gaze of user). In some embodiments, the user interface may be displayed on another device that the smartglasses are communicatively coupled to, and the user may select the preview option using any suitable user input (e.g., touch screen, mouse, etc.).

In other embodiments, eye tracking may be used to determine eye dominance. For example, instead of using user selection of a preview option, the system or wearable device may perform an eye dominance test that utilizes eye tracking. Eye tracking may be used to identify and track a pupil or gaze of a user. The system may display calibration points, for the user to look at, and measure deviations from a gaze of a right eye or a left eye of the user to the calibration points that are displayed. In some embodiments, deviations from a binocular gaze may be measured. The system may determine which eye of the user is dominant based on which eye gaze (right or left) has a smaller deviation to the calibration point. If the user does not have a dominant eye, the binocular gaze may have smaller deviation to the calibration point than a left eye or a right eye gaze. If the left eye is dominant, the left eye gaze may have a smaller deviation to the calibration point than the right eye or binocular view. If the right eye is dominant, the right eye gaze may have a smaller deviation to the calibration point than the left eye or binocular view.

At 410, the system may determine eye dominance based on the selected option. If the input indicates a preference for the first preview option, the system may determine the dominant eye of the user is the left eye of the user. If the input indicates a preference for the second preview option, the system may determine the dominant eye of the user is the right eye of the user. For example, in response to the input indicating a preference for the first preview option corresponding to a perspective of a left eye of the user, the system determines the dominant eye of the user is the left eye of the user. In another example, in response to the input indicating a preference for the second preview option corresponding to a perspective of a right eye of the user, the system determines the dominant eye of the user is the right eye of the user. The system may store the determined dominant eye of the user as the dominant eye characteristic of the user in a user profile. In some embodiments, the system may additionally or alternatively present the user with an option corresponding to a perspective from a position in between the eyes of a user, and the system may determine the dominant eye characteristic of the user based on an input indicating a preference for the option corresponding to the perspective from the position in between the eyes of the user (e.g., for a user that does not have a dominant eye). The system may store that the user does not have a dominant eye as the dominant eye characteristic of the user in a user profile.

Figure 5:
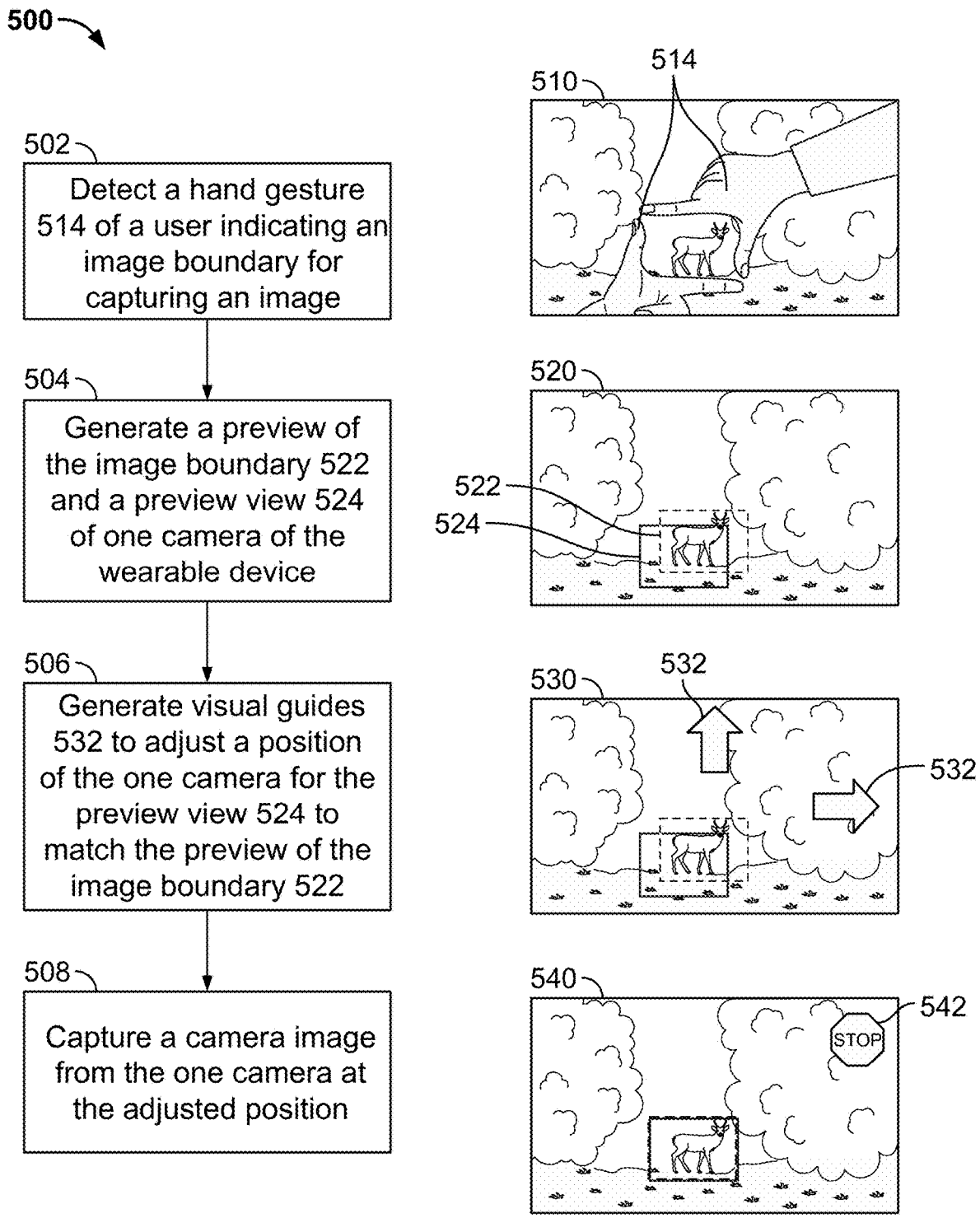
FIG. 5 shows an illustrative example of a method to capture an image from a camera view at a preview of an image boundary determined from a hand gesture of a user, in accordance with some embodiments of this disclosure.

FIG. 5 shows an illustrative example 500 of a method to capture an image from a camera view at a preview of an image boundary determined from a hand gesture of a user, in accordance with some embodiments of this disclosure. In some embodiments, rather than synthesize a new image from captured images of camera views, the system presents visual guides for a user to adjust a position of a camera of the wearable device so that one of the front-facing cameras is positioned at the dominant eye view (e.g., dominant pupil position) with the same rotation or within a threshold position and rotation of the dominant pupil position. The system may have positioning data available (e.g., via simultaneous localization and mapping (SLAM)). The system may have a single front-facing camera.

At 502, a system detects a hand gesture 514 of a user indicating an image boundary for capturing an image. Step 502 of FIG. 5 is similar to step 402 of FIG. 4 or step 102 of FIG. 1. The system may detect that a user has moved the gesture out of the camera view or outside of a detected image boundary, and may proceed to step 504. Image 510 shows a viewpoint of a user including a hand gesture 514 of the user indicating a rectangular image boundary for capturing an image of a deer in a real-world environment.

At 504, the system generates a preview of the image boundary 522 and a preview view 524 of one camera of the wearable device. Image 520 shows a viewpoint of a user including a preview of the image boundary 522 and a preview view 524 of one camera of the wearable device.

For example, the system generates a preview of the image boundary 522 based on the detected hand gesture 514. The system may determine the coordinates for the detected hand gesture 514 from a viewpoint based on a dominant eye characteristic of the user. The system may synthesize an image from a viewpoint using a dominant eye of the user using images from one camera view. In some embodiments, the system may synthesize an image using images from multiple camera views. In some cases, where there is not a dominant eye of the user, the system may synthesize a view from in between the eyes of the user.

In some embodiments, where a preview is being shown (e.g., image boundary 522), the preview may only be shown to one eye of the user. For example, if using smartglasses with a transparent display over only one eye, the system displays a frame/boundary on the available display. The position of the displayed frame/boundary may be adjusted based on a dominant eye characteristic of the user. For example, if a right-eye-dominant user wears smartglasses with a transparent display over only the left eye, the frame/boundary position would be shifted to align their perception of the frame/boundary with its intended position. As another example, where there is a left and right eye display to the user, a system may only display the frame/boundary in the display of the dominant eye to the user. For example, if using a wearable display with two transparent displays, one for each eye of the user, the system only displays a frame/boundary on the transparent display corresponding to the dominant eye of the user, or if using a wearable display with two curved mirror displays or a wearable display with two waveguide displays, one for each eye of the user, the system only includes the frame/boundary to the projected image to the dominant eye of the user.

At 506, the system generates visual guides 532 to adjust a position of the one camera for the preview view 524 to match the preview of the image boundary 522. For example, image 530 shows visual guides 532 as up and right arrows. The up and right arrows indicate to adjust a position of the one camera for the preview view 524 to match the preview of the image boundary 522. Image 540 shows a visual guide 542 as a stop sign. The stop sign indicates to stop adjusting the position of the one camera as the preview view 524 matches the preview of the image boundary 522.

At 508, the system captures a camera image from the one camera at the adjusted position. For example, the captured camera image may be an image captured at the camera placed at a dominant eye viewpoint of the user, and represent an image captured at a dominant eye viewpoint of the user.

Figure 6A:
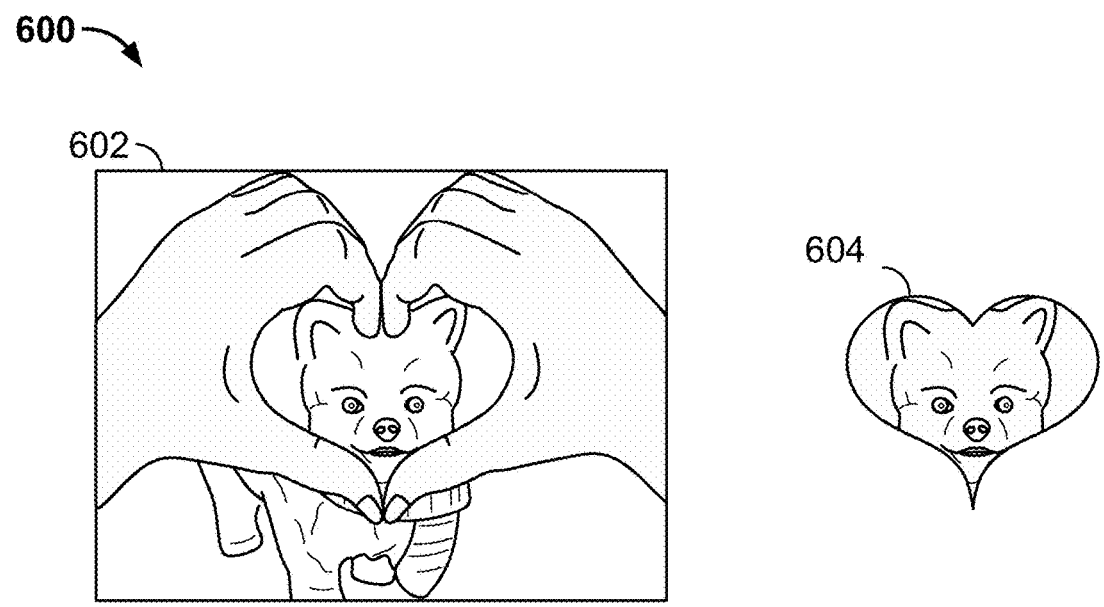
FIG. 6A shows an illustrative example of a hand gesture of a heart as an image boundary, in accordance with some embodiments of this disclosure.

FIG. 6A shows an illustrative example 600 of a hand gesture of a heart as an image boundary, in accordance with some embodiments of this disclosure. For example, image 602 shows the hands of a user in a heart shape to frame a face of a dog in a view of the user. The generated captured image 604 is the face of the dog in a heart shape.

Figure 6B:
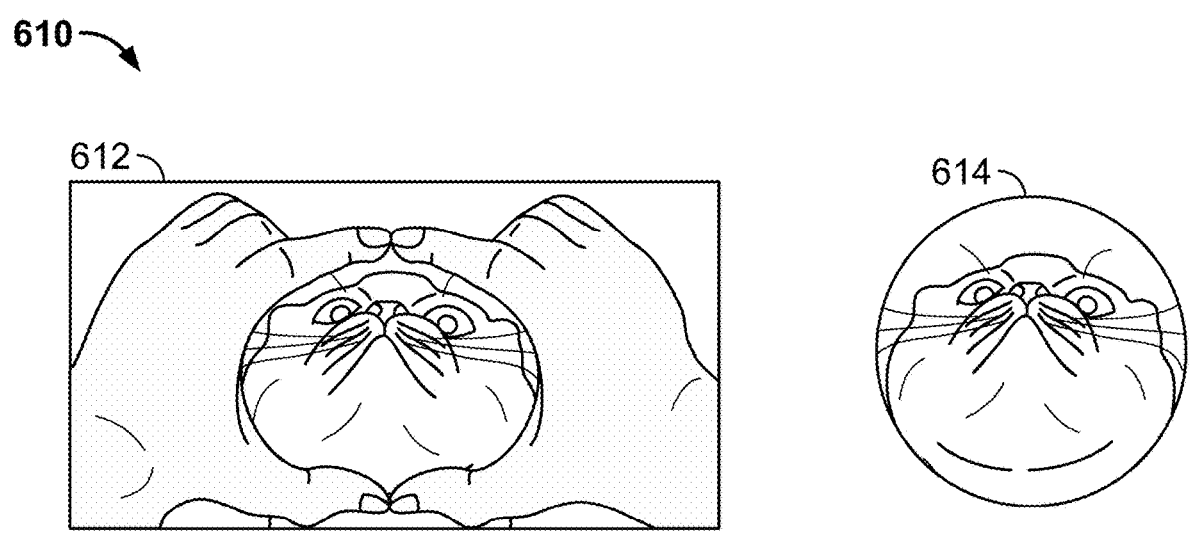
FIG. 6B shows an illustrative example of a hand gesture of a circle for an image boundary, in accordance with some embodiments of this disclosure.

FIG. 6B shows an illustrative example 610 of a hand gesture of a circle for an image boundary, in accordance with some embodiments of this disclosure. For example, the image 612 shows the hands of a user in a circular shape to frame a face of a cat in a view of the user. The generated captured image 614 is the face of the cat in a circular shape.

In some embodiments, instead of the hand gesture as shown in FIGS. 1, 2, 4, and 5, being a rectangular shape, or in 6A as a heart shape, or in 6B as a circular shape, the hand gesture may be any suitable shape (e.g., diamond, oval, irregular shape, etc.).

Figure 7B:
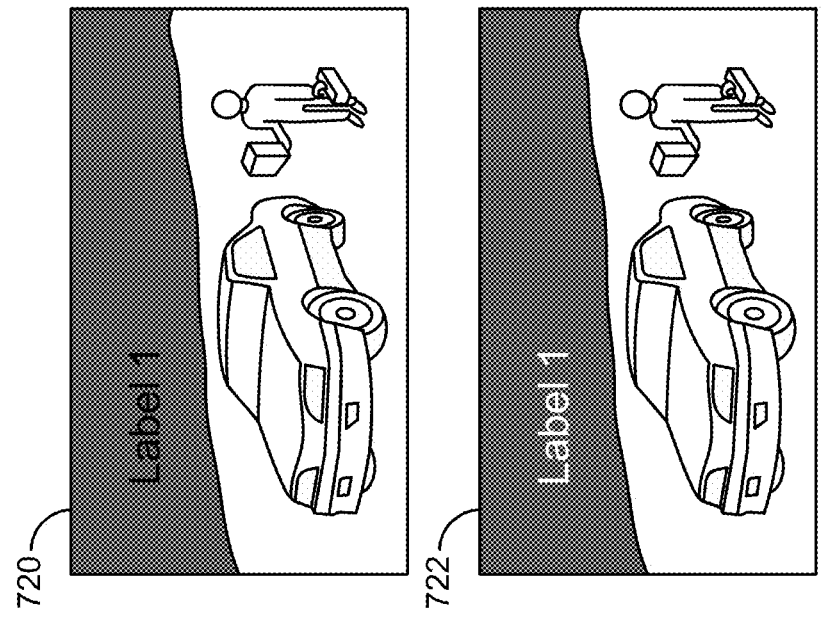
FIG. 7B shows an illustrative example of determining a color of a label using a dominant eye view of a user, in accordance with some embodiments of this disclosure.
Figure 7A:
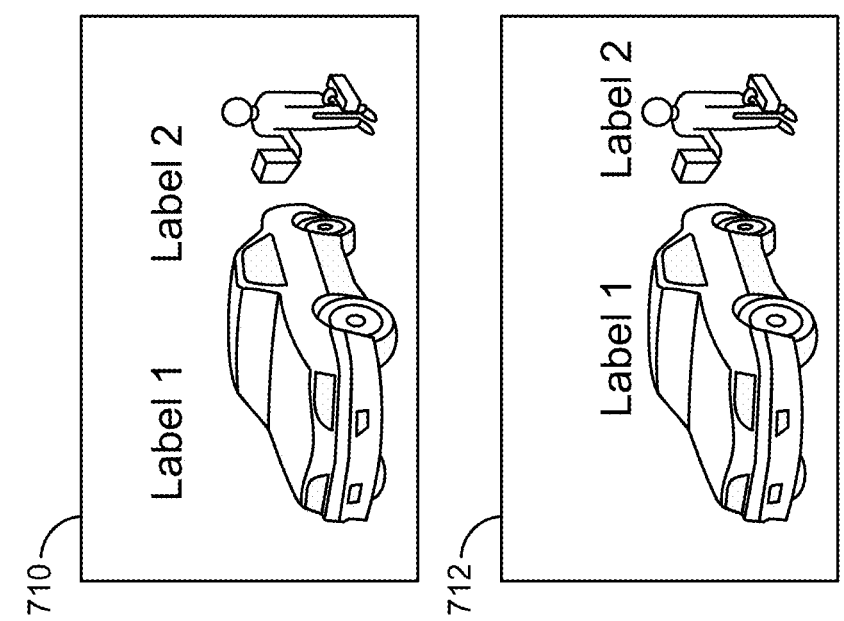
FIG. 7A shows an illustrative example of determining a position of a label using a dominant eye view of a user, in accordance with some embodiments of this disclosure.

FIG. 7A shows an illustrative example of determining a position of a label using a dominant eye view of a user, in accordance with some embodiments of this disclosure. For example, a system may generate for display a virtual object (e.g., text, label, or any suitable object) in which the position of the virtual object may be based on a position of one or more real-world objects in a generated image (e.g., synthesized image based on a dominant eye view of a user).

A system which does not determine a position of a label based on a dominant eye view of a user may result in inaccurate placement of labels for real-world objects in a view. In image 710, a car is labeled with "Label 1" and person is labeled with "Label 2". However, the position of the labels is not aligned with to the real-world object that it is labeling (e.g., to the left and not centered). In some cases, this may lead to confusion as to which object is being labeled. For example, the position of "Label 2" is in between the car and the person.

A system which determines a position of a label based on a dominant eye view of a user may result in better placement of labels for real-world objects in a view. In image 712, the position of the label is aligned more appropriately with the real-world object it is labeling. For example, "Label 1" and "Label 2" are aligned more centrally to the car and person, respectively in image 712 than the alignment of the labels in image 710.

FIG. 7B shows an illustrative example of determining a color of a label using a dominant eye view of a user, in accordance with some embodiments of this disclosure. For example, a system may generate for display a virtual object. The color of the virtual object may be determined based on a color of one or more pixels in the generated image (e.g., synthesized image from a dominant eye view of the user) corresponding to one or more positions in an edge of the virtual object.

A system which does not determine a color of a label based on a dominant eye view of a user may result in a color of a label that is difficult to view. In image 720, the color of "Label 1" may be close in color to a background that the label overlays. This may make the label difficult to see from the background.

A system which determines a color of the label based on a color of pixel(s) corresponding to the edge positions in an edge of the label may result in a label that is more easily seen. In image 722, the color of the label is lighter which shows up more appropriately against the darker background that the label overlays.

Figure 8:
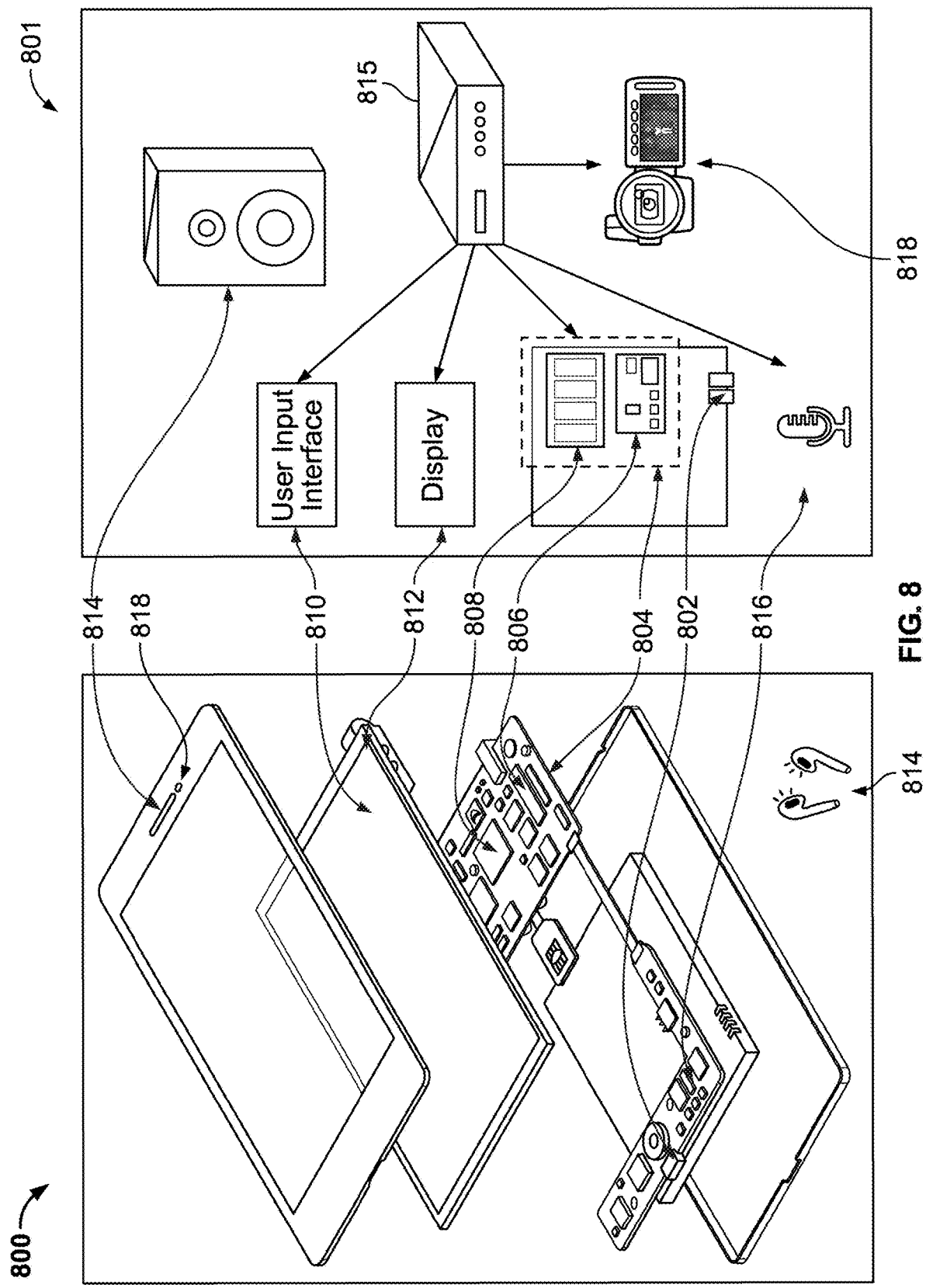
FIG. 8 shows an illustrative user equipment device, in accordance with some embodiments of this disclosure.
Figure 9:
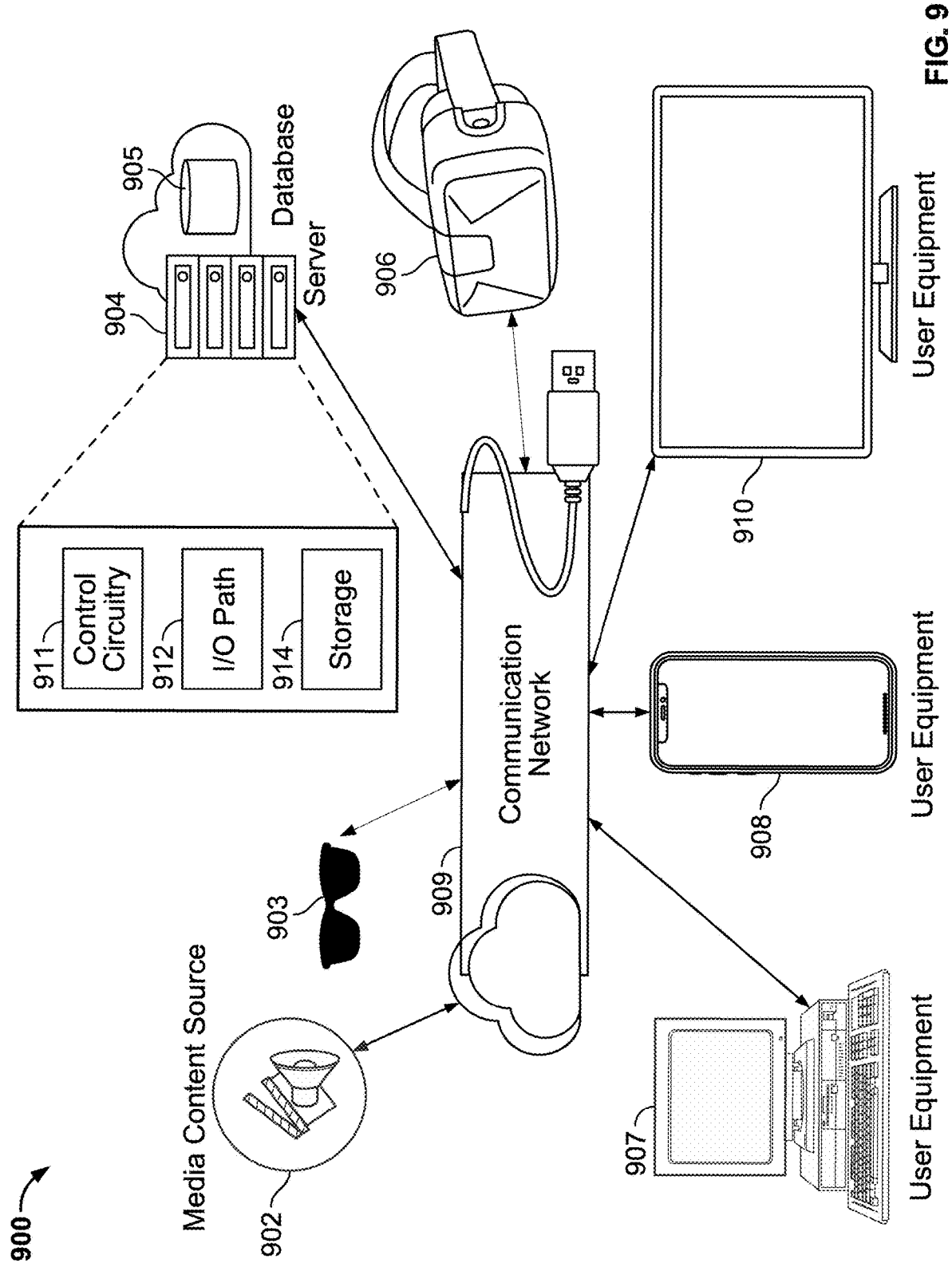
FIG. 9 shows an example system, in accordance with some embodiments of this disclosure.

FIGS. 8-9 depict illustrative devices, systems, servers, and related hardware for an image capture system, in accordance with some embodiments of the present disclosure. FIG. 8 shows generalized embodiments of illustrative user equipment devices 800 and 801, which may perform the functions described herein. For example, user equipment device 800 may be a smartphone device, a tablet, a virtual reality or augmented reality device, or any other suitable computing device. In another example, user equipment device 801 may be a user television equipment system or device. User television equipment device 801 may include computing device 815. Computing device 815 may be communicatively connected to microphone 816, audio output equipment (e.g., speaker or headphones 814), and display 812. In some embodiments, display 812 may be a television display or a computer display. In some embodiments, computing device 815 may be communicatively connected to user input interface 810. In some embodiments, user input interface 810 may be a remote-control device. Computing device 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 800 and user equipment device 801 may receive content and data via input/output (I/O) path (e.g., circuitry) 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While one example of a computing device 815 is shown in FIG. 8 for illustration, any suitable computing device having processing circuitry, control circuitry, and storage may be used in accordance with the present disclosure. For example, computing device 815 may be replaced by, or complemented by, a personal computer (e.g., a notebook, a laptop, a desktop), a smartphone (e.g., device 800), a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the image capture application stored in memory (e.g., storage 808). Specifically, control circuitry 804 may be instructed by the image capture application to perform the functions discussed above and below. In some implementations, processing or actions performed by control circuitry 804 may be based on instructions received from the image capture application.

In client/server-based embodiments, control circuitry 804 may include communications circuitry suitable for communicating with a server or other networks or servers. The image capture application may be a stand-alone application implemented on a device or a server. The image capture application may be implemented as software or a set of executable instructions. The instructions for performing any of the embodiments discussed herein of the image capture application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the image capture application may be a client/server application where only the client application resides on device 800 (e.g., device 104), and a server application resides on an external server (e.g., server 904 and/or server 916). For example, the image capture application may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing image capture capabilities, providing storage (e.g., for a database) or parsing data (e.g., using machine learning algorithms described above and below) are provided by a collection of network-accessible computing and storage resources (e.g., server 904 and/or edge computing device 916), referred to as "the cloud." Device 800 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904 or 916, the image capture application may instruct control 911 or 918 circuitry to perform processing tasks for the client device and facilitate the image capture.

Control circuitry 804 may include communications circuitry suitable for communicating with a server, edge computing systems and devices, a table or database server, or other networks or servers. The instructions for carrying out the above mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as image capture application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders, MPEG-4 decoders, HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive image capture data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment device 800 and user equipment device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The image capture application may be implemented using any suitable architecture. For example, it may be a stand-alone application wholly implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide image capture functionality and perform any of the actions discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the image capture application is a client/server-based application. Data for use by a thick or thin client implemented on each one of user equipment device 800 and user equipment device 801 may be retrieved on-demand by issuing requests to a server remote to each one of user equipment device 800 and user equipment device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the image capture application may be downloaded and interpreted or otherwise run by an interpreter or virtual machine (run by control circuitry 804). In some embodiments, the image capture application may be encoded in the ETV Binary Interchange Format (EBIF), received by control circuitry 804 as part of a suitable feed, and interpreted by a user agent running on control circuitry 804. For example, the image capture application may be an EBIF application. In some embodiments, the image capture application may be defined by a series of JAVA-based files that are received and run by a local virtual machine or other suitable middleware executed by control circuitry 804. In some of such embodiments (e.g., those employing MPEG-2, MPEG-4, HEVC or other digital media encoding schemes), image capture application may be, for example, encoded and transmitted in an MPEG-2 object carousel with the MPEG audio and video packets of a program.

FIG. 9 is a diagram of an illustrative system 900 for image capture, in accordance with some embodiments of this disclosure. User equipment devices 903, 906, 907, 908, 910 (e.g., which may correspond to one or more of computing device may be coupled to communication network 909). Communication network 909 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 909.

System 900 may comprise media content source 902, one or more servers 904, and one or more edge computing devices. In some embodiments, the image capture application may be executed at one or more of control circuitry 911 of server 904 (and/or control circuitry of user equipment devices 903, 906, 907, 908, 910 and/or control circuitry of one or more edge computing devices). In some embodiments, data may be stored at database 905 maintained at or otherwise associated with server 904, and/or at storage 922 and/or at storage of one or more of user equipment devices 903, 906, 907, 908, 910.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide image capture data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Figure 10:
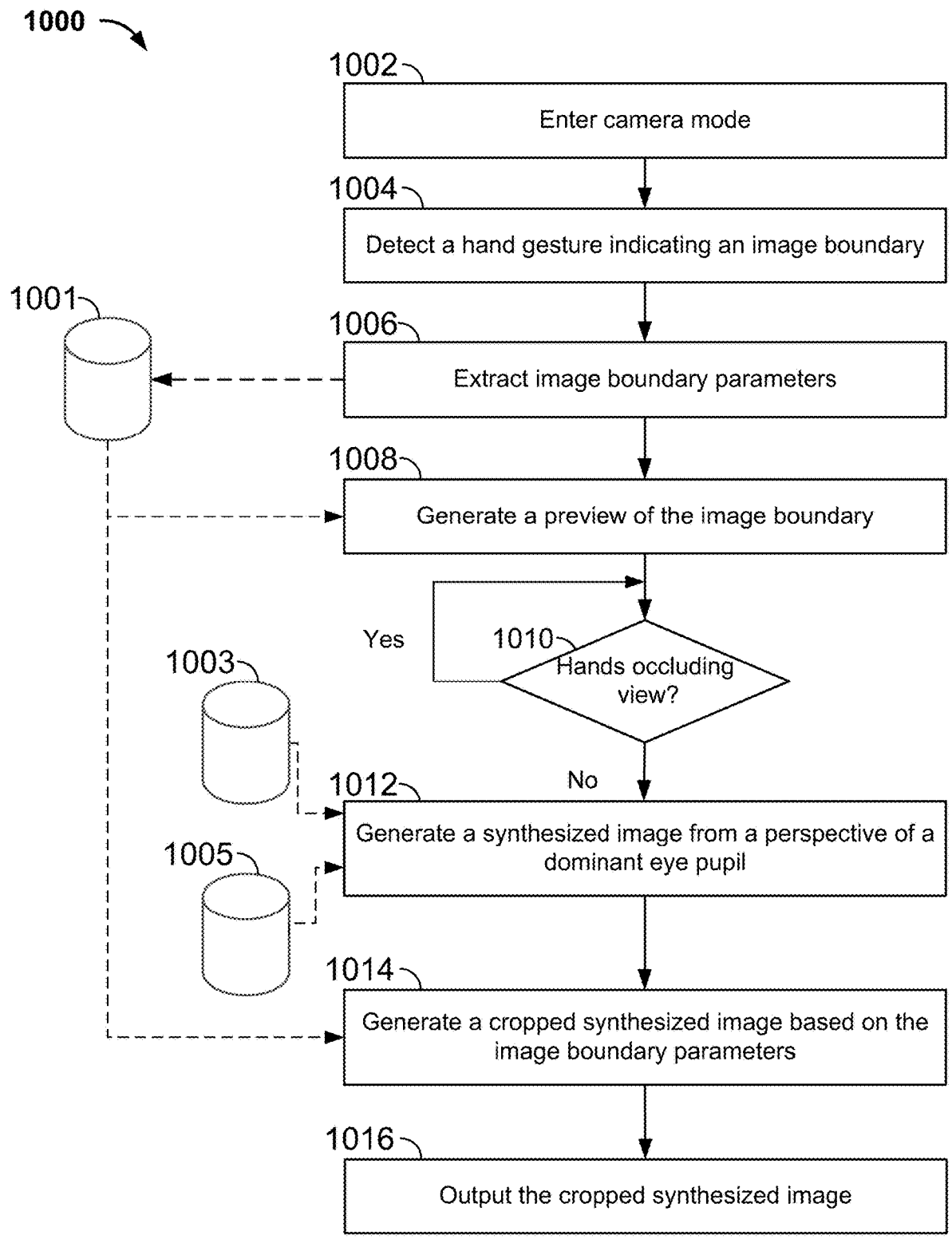
FIG. 10 is a flowchart of a detailed illustrative process for capturing an image from a viewpoint of a dominant eye of a user, in accordance with some embodiments of this disclosure.

FIG. 10 is a flowchart of a detailed illustrative process for capturing an image from a viewpoint of a dominant eye of a user, in accordance with some embodiments of this disclosure. In various embodiments, the individual steps of process 1000 may be implemented by one or more components of the devices and systems of FIGS. 1, 2, and 4-5. Although the present disclosure may describe certain steps of process 1000 (and of other processes described herein) as being implemented by certain components of the devices and systems of FIGS. 1, 2, and 4-5, this is for purposes of illustration only, and it should be understood that other components of the devices and systems of FIGS. 1, 2, and 4-5 may implement those steps instead.

At step 1002, control circuitry (e.g., control circuitry 911, or control circuitry of any of devices 903, 906, 907, 908, or 910) enters camera mode. In some embodiments, a system may automatically enter camera mode. In other embodiments, a system may receive input from a user wearing a wearable device to enter camera mode of the wearable device. In some embodiments, a user may enter a camera mode of the wearable device by using a hand gesture. For example, the user may indicate an image boundary of an image to be captured to enter a camera mode. In some embodiments, a user may use an audio command or button press to enter a camera mode of the wearable device. In some embodiments, a user may enter a camera mode of the wearable device by interacting with a user interface displayed on a mobile device (e.g., smartphone or tablet) that the wearable device is coupled to.

At step 1004, the control circuitry detects a hand gesture. For example, the system detects a hand gesture of a user indicating an image boundary of an image to be captured.

At step 1006, the control circuitry extracts relevant parameters. For example, the control circuitry extracts X, Y coordinates from the detected hand gesture indicating an image boundary. Control circuitry may store the hand gesture parameters to storage 1001.

At step 1008, the control circuitry generates a visual preview of the image boundary. Control circuitry may access or receive the stored hand gesture parameters from storage 1001. The control circuitry may generate a preview of the image boundary based on the hand gesture parameters. In some embodiments, the control circuitry may generate a preview of the image boundary based on eye dominance characteristics of a user and the hand gesture parameters.

At step 1010, the control circuitry determines whether hands (e.g., a hand gesture) are occluding a view (e.g., camera view, region of interest to capture an image). If the control circuitry determines that hands are occluding a view, the control circuitry continues to check at step 1010. If the control circuitry determines that hands are not occluding a view, the control circuitry proceeds to step 1012.

At step 1012, the control circuitry generates a synthesized image from a perspective of a dominant eye pupil (e.g., dominant eye of a user). Control circuitry may access or receive dominant eye characteristic of a user from storage 1003. For example, the dominant eye characteristic may be from a completed eye dominance test, and may be stored in a user profile of the user. Control circuitry may access or receive eye offset information from storage 1005. For example, the eye offset information may be from a wearable device manufacturer. Storage 1005 may be local storage (e.g., storage of the wearable device), or remote storage (e.g., storage of the wearable device manufacturer) accessed by the wearable device.

At step 1014, control circuitry applies cropping to the synthesized image. For example, the control circuitry generates a cropped synthesized image based on image boundary parameters. Control circuitry may access or receive hand gesture parameters from storage 1001.

At step 1016, input/output circuitry 912 of the control circuitry outputs the cropped synthesized image. In some embodiments, input/output circuitry may generate for display the cropped synthesized image. In some embodiments, the system stores the cropped synthesized image to storage. For example, control circuitry may store the cropped synthesized image to storage.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising: detecting, by a wearable device, a hand gesture of a user indicating an image boundary for capturing an image from one or more cameras of the wearable device; generating, by the wearable device, a synthesized image based on a dominant eye characteristic of the user, wherein: the dominant eye characteristic indicates a dominant eye of the user; the synthesized image comprises a region within the image boundary determined from a perspective of the dominant eye of the user; and the region is generated from one or more images captured from the one or more cameras of the wearable device; and storing, by the wearable device, the synthesized image to memory.

2. The method of claim 1, wherein generating the synthesized image comprises: determining the image boundary from the detected hand gesture based on the dominant eye characteristic of the user; and cropping an image of the one or more images captured from the one or more cameras of the wearable device based on the determined image boundary, wherein the synthesized image comprises the cropped image.

3. The method of claim 1, further comprising:
extracting spatial coordinates from the hand gesture to determine the image boundary; and
generating for display a preview of the image boundary.

4. The method of claim 1, wherein the generating the synthesized image is performed without generating for display a preview of the image boundary.

5. The method of claim 1, further comprising:
determining that the hand gesture of the user is no longer present in a current view of the one or more cameras of the wearable device; and
capturing, in response to the determining that the hand gesture is no longer present in the current view, the one or more images from the one or more cameras.

6. The method of claim 1, wherein: the generating the synthesized image is further based on a positional offset between the dominant eye of the user and at least one of the one or more cameras.

7. The method of claim 6, wherein the positional offset is based on default offset data from a manufacturer of the wearable device.

8. The method of claim 6, wherein the positional offset is based on eye tracking data.

9. The method of claim 6, wherein the positional offset is based on an interpupillary distance (IPD) of the user.

10. The method of claim 1, further comprising determining the dominant eye characteristic of the user by performing an eye dominance test.

11. The method of claim 1, further comprising determining, from a user profile, the dominant eye characteristic of the user.

12. The method of claim 1, further comprising: generating a first preview option of a first cropped image corresponding to a perspective of a left eye of the user; generating a second preview option of a second cropped image corresponding to a perspective of a right eye of the user; receiving an input indicating a preference for the first preview option or the second preview option; at a first time, based on the input indicating a preference for the first preview option, determining the dominant eye of the user to be the left eye of the user; at a second time, based on the input indicating a preference for the second preview option, determining the dominant eye of the user to be the right eye of the user; and storing the determined dominant eye of the user as the dominant eye characteristic of the user in a user profile.

13. The method of claim 1, further comprising: determining the image boundary from the detected hand gesture based on the dominant eye characteristic of the user; generating for display a preview of the image boundary; generating for display a preview view of one camera of the one or more cameras; and generating visual guides to adjust a position of the one camera of the one or more cameras for the preview view of the one camera to match the preview of the image boundary, wherein the generating the synthesized image comprises: capturing a camera image from the one camera at the adjusted position of the one camera representing a view based on the dominant eye characteristic of the user, the captured camera image being the one or more images captured from the one or more cameras of the wearable device; and cropping the captured camera image based on the determined image boundary, wherein the synthesized image is the cropped captured image.

14. The method of claim 1, further comprising: receiving an input action triggering the capturing of the image, wherein the input action comprises at least one of a verbal command, a hand gesture outside the image boundary, or a button press.

15. The method of claim 1, wherein the generating the image comprises:
determining the image boundary from the detected hand gesture based on the dominant eye characteristic of the user; and
zooming in, by the one or more cameras to a region of a view indicated by the determined image boundary prior to capturing the one or more images.

16. The method of claim 1, further comprising: generating for display a virtual object, wherein a position of the virtual object is determined based on a position of one or more objects in the synthesized image, and wherein a color of the virtual object is determined based on a color of one or more pixels in the synthesized image corresponding to one or more positions in an edge of the virtual object.

17. A system comprising: one or more cameras; memory; and control circuitry configured to: detect, by a wearable device, a hand gesture of a user indicating an image boundary for capturing an image from the one or more cameras of the wearable device; and generate, by the wearable device, a synthesized image based on a dominant eye characteristic of the user, wherein: the dominant eye characteristic indicates a dominant eye of the user; the synthesized image comprises a region within the image boundary determined from a perspective of the dominant eye of the user; and the region is generated from one or more images captured from the one or more cameras of the wearable device; and store, by the wearable device, the synthesized image to the memory.

18. The system of claim 17, wherein the control circuitry is configured to generate the synthesized image by: determining the image boundary from the detected hand gesture based on the dominant eye characteristic of the user; and cropping an image of the one or more images captured from the one or more cameras of the wearable device based on the determined image boundary, wherein the synthesized image comprises the cropped image.

19. The system of claim 17, wherein the control circuitry is further configured to: extract spatial coordinates from the hand gesture to determine the image boundary; and generate for display a preview of the image boundary.

20. The system of claim 17, wherein the control circuitry is configured to generate the synthesized image without generating for display a preview of the image boundary.

* * * * *